(12) United States Patent
Hwang et al.

(10) Patent No.: US 7,373,526 B2
(45) Date of Patent: May 13, 2008

(54) SYSTEM AND METHOD FOR MANAGING POWER IN AN ASF SYSTEM

(75) Inventors: Andrew S. Hwang, Redondo Beach, CA (US); Andrew M. Naylor, Santa Ana, CA (US); Steven B. Lindsay, Mission Viejo, CA (US); Habib Anthony Abouhossein, Corona Del Mar, CA (US); Scott Sterling McDaniel, Villa Park, CA (US)

(73) Assignee: Broadcom Corporation, Irvine, CA (US)

( * ) Notice: Subject to any disclaimer, the term of this patent is extended or adjusted under 35 U.S.C. 154(b) by 1063 days.

(21) Appl. No.: 10/131,623

(22) Filed: Apr. 24, 2002

(65) Prior Publication Data

US 2002/0188875 A1 Dec. 12, 2002

Related U.S. Application Data

(60) Provisional application No. 60/286,320, filed on Apr. 24, 2001.

(51) Int. Cl.
*G06F 1/00* (2006.01)
*G06F 11/30* (2006.01)

(52) U.S. Cl. ............... 713/300; 713/322; 713/340

(58) Field of Classification Search ............ 713/200, 713/300
See application file for complete search history.

(56) References Cited

U.S. PATENT DOCUMENTS

| | | | |
|---|---|---|---|
| 5,249,113 A | | 9/1993 | Perol |
| 5,331,353 A | * | 7/1994 | Levenson et al. ............ 725/29 |
| 5,928,368 A | * | 7/1999 | Jardine et al. ............... 714/22 |
| 5,938,771 A | | 8/1999 | Williams et al. |
| 5,946,205 A | | 8/1999 | Kawakami et al. |
| 6,021,493 A | * | 2/2000 | Cromer et al. ............... 726/35 |
| 6,266,776 B1 | * | 7/2001 | Sakai ........................ 713/300 |
| 6,622,252 B1 | * | 9/2003 | Klaassen et al. ............ 713/320 |
| 6,748,547 B1 | * | 6/2004 | Inoue ........................ 713/322 |

FOREIGN PATENT DOCUMENTS

JP 02000259288 A 9/2000

OTHER PUBLICATIONS

Modern VLSI Design, 1998, Prentice Hall, 3rd Edition, Chapter 7, Slides 24 and 32.*
Cline, Kevin, Alert Standard Format Specification, Oct. 13, 2000, Version 1.0a.*
PCI Bus Power Management Interface Specification, Dec. 18, 1998, PCI Special Interest Group, Revision 1.1.*
International Search Report for PCT/US02/13149, Apr. 21, 2004.

* cited by examiner

*Primary Examiner*—Rehana Perveen
*Assistant Examiner*—Michael J Brown
(74) *Attorney, Agent, or Firm*—McAndrews, Held & Malloy, Ltd.

(57) ABSTRACT

Techniques are disclosed for providing system manageability for computing systems operating under OS-absent conditions. In particular, techniques are disclosed for providing fully functional system management capabilities even when the primary power source for the computing system is disabled. One aspect of the invention relates to a power supply control that facilitates the realization of low power consumption integrated circuit systems. Another aspect of the invention relates to providing fully functional ASF support when operating on auxiliary power. In one embodiment, this is implemented in a local bus adapter/controller that integrates network communication, management, and support features.

56 Claims, 10 Drawing Sheets

SYSTEM AND METHOD FOR MANAGING POWER IN AN ASF SYSTEM

CROSS-REFERENCE TO RELATED APPLICATION(S)

The present application claims priority on the basis of the following United States Provisional Patent Application, the entire contents of which is herein incorporated by reference as though set forth in full: Ser. No. 60/286,320, filed Apr. 24, 2001, and entitled "INTEGRATED GIGABIT ETHERNET PCI-X CONTROLLER." The present application also is related to co-pending U.S. patent application Ser. No. 09/865,844, filed May 25, 2001, and entitled "MULTIPROTOCOL COMPUTER BUS INTERFACE ADAPTER AND METHOD," the entire contents of which is incorporated herein by reference as though set forth in full. The present application also is related to co-pending United States Patent Application entitled "ALERTING SYSTEM, ARCHITECTURE AND CIRCUITRY," with named inventors Steven B. Lindsay, Andrew SeungHo Hwang and Andrew M. Naylor filed on Apr. 24, 2002, the entire contents of which is incorporated herein by reference as though set forth in full. The present application also is related to co-pending United States Patent Application entitled "ASF MEMORY LOADING AND HANDLING SYSTEM," with named inventors Steven B. Lindsay, Andrew SeungHo Hwang and Andrew M. Naylor filed on Apr. 24, 2002, the entire contents of which is incorporated herein by reference as though set forth in full. The present application also is related to co-pending United States patent application entitled "INTEGRATED GIGABIT ETHERNET PCI-X CONTROLLER," with named inventors Steven B. Lindsay, Andrew SeungHo Hwang, Andrew M. Naylor, Michael Asker, Jennifer Chaio, Myles Wakayama and Gary Alvstad filed on Apr. 24, 2002, the entire contents of which is incorporated herein by reference as though set forth in full.

BACKGROUND OF THE INVENTION

1. Field of the Invention

The present invention relates to integrated circuits and, more specifically, to power management systems and methods.

2. Background of the Invention

To reduce the total cost of ownership of computing systems such as personal computers, a number of technologies have been developed to provide more cost effective system maintenance and to maximize system "up-time". For example, some of these technologies give IT administrators more visibility and control over remote systems. Traditionally, these technologies require that the "managed" system is an operational state with the Operating System (e.g., Microsoft Windows®) of the computing system loaded. Examples of technologies that require the operating system ("OS") to be loaded are Desktop Management Interface ("DMI") and Common Information Model ("CIM").

In general, however, technologies that require the OS to be loaded do not allow an administrator to have remote visibility or access to systems that have serious hardware or software problems that prevent the OS from loading or working correctly. In addition, these technologies do not allow for a system to be remotely managed while in a low power mode. For these scenarios, there is a need for a standardized low-level technology that gives administrators remote access to and control over the managed system.

Several vendors have developed proprietary technologies in this area. Intel and IBM created Alert on LAN (AoL) technology. AoL provided remote notification of local system states and various hardware or software failures in an OS absent environment. In addition, Intel and others developed the Platform Event Trap ("PET") format, to describe how alerts were formatted over the network.

As the number of these technologies increased, computing system vendors were faced with the possibility of having to support several different alerting standards. As a result, the Distributed Management Task Force ("DMTF") developed an open remote control and alerting standard: the Alert Standard Format ("ASF").

ASF is a specification that defines methods for alerting and remote system control. ASF is specifically targeted at OS-absent environments. As used herein, the term "OS-absent" refers to a computer system that is in a state including, without limitation, a no active OS state, an inoperable OS state, a low-power state, and/or a system-sleep state.

The remote control and alerting system defined by ASF includes a remote management console that communicates with one or more clients. Here, the term "client" refers to a managed computing system. Typically, the remote management console is located remotely from the computing systems and communicates with the clients via a network. An alert sending device ("ASD"), which is a component in each client, interfaces with other components in the computing system to respond to remote control requests from the remote management console. Such requests include, for example, power-up, power-down and maintenance requests. The ASD also interfaces with sensors in the client computing system. When a sensor detects an "alert event," the ASD in the client sends a corresponding alerting message to the remote management console. To this end, the ASF specification defines interfaces for sensors, alert sending devices (which may include, for example, network interface cards or Modems), remote management console software, and system firmware in order to allow system vendors (and system component vendors) to develop ASF compliant products.

In summary, the above technologies, collectively referred to as "system manageability" technologies, enable remote system access and control in both OS-present and OS-absent environments. These technologies are primarily focused on minimizing on-site maintenance; maximizing system availability and performance to the local user; maximizing remote visibility of (and access to) local systems by network administrators; and minimizing the system power consumption required to keep this remote connection intact.

While the ASF standard specifies protocols that may be used to address problems associated with "system manageability," the ASF standard falls short of addressing many issues involved in providing a robust remote control and alerting system implementation. Accordingly, there is a need for improvements in ASF implementation in the art.

In addition, there is a need for improved power management capabilities in computing systems. Conventional power supply architectures in computing systems involve generating one or more voltage levels and providing these supply voltages to integrated circuits in the computing system. Typically, several different supply voltages are required to power different components of an integrated circuit. For example, the input-output circuits in some integrated circuits are powered off of a 3.3V supply while the digital circuits are powered off of a 1.8V supply. In addition, the analog circuits may be powered off of 1.3V, 1.8V and 2.5V supplies.

In some systems, a main power supply provides one or more voltage levels and other devices such as DC-to-DC converters convert these voltage levels to other voltage levels. For example, the PCI bus in personal computers provides two primary supply voltages of 5V and 3.3V for supplying power to devices connected to the bus. In addition, the specification defines an auxiliary 3.3V supply, named Vaux power. Vaux power is designed to provide limited power to the PCI bus devices in the event the primary supply is off. Thus, in many systems, DC-to-DC converters are used to provide a 3.3V supply and a 1.8V supply by converting the 5V level to a 3.3V level and a 1.8V level, respectively. Alternatively, a DC-to-DC converter may be used to provide a 1.8V supply from the 3.3V supply.

Many conventional DC-to-DC converters consist of standalone integrated circuits that include circuitry for converting the DC voltage level and compensation circuits for ensuring that the output level remains relatively constant under varying load conditions. Two common types of DC-to-DC converters are switching regulators and linear regulators. These converters, however, may be relatively expensive and may dissipate a significant amount of power.

SUMMARY OF THE INVENTION

Techniques are disclosed for providing system manageability for computing systems operating under OS-absent conditions. In particular, techniques are disclosed for providing fully functional system management capabilities even when the primary power source for the computing system is disabled.

One aspect of the invention relates to a power supply control that facilitates the realization of low power consumption integrated circuit systems. For example, one embodiment of the invention provides a power source for an integrated circuit. The power source includes a regulator portion and a control portion circuit that controls the regulator portion. In accordance with this aspect of the invention, the control portion is located in the integrated circuit while the regulator portion, which consumes a relatively large amount of power, is located off of the integrated circuit. Accordingly, the invention provides a relatively low cost power supply scheme that is particularly useful in computing systems that operate under low power constraints.

Another aspect of the invention relates to providing fully functional ASF support when operating on auxiliary power. In one embodiment, this is implemented in a local bus adapter/controller that integrates network communication, management, and support features.

For example, one embodiment of the invention describes a network controller that provides integrated support for OS-absent ASF management while powered by the PCI bus auxiliary power which supplies a maximum current of 375 mA. This includes circuitry for reducing clock speeds and interfacing with powered-off portions of the integrated circuit, while maintaining communications with external devices via Ethernet and SMBus interfaces.

In one embodiment, an ASF-compliant device is capable of booting while powered by auxiliary power. This includes providing ASF firmware in a nonvolatile data memory and boot code that enables the ASF device to load the ASF firmware. The relevant portions of the ASF device and the nonvolatile memory and all interfaces between the two are powered by auxiliary power. Hence, all of these operations may be performed when primary power is off.

One embodiment of the invention is implemented in a network controller. The network controller includes a multiprotocol bus interface adapter coupled between a communication network and a computer bus. An alert standard format controller cooperates with the multiprotocol bus interface adapter to monitor and manage the routing of alert standard format messages between the communication network and the computer bus.

In one embodiment, the network controller is an advanced, high-performance, high-bandwidth, highly-integrated controller that integrates complex network communication, management, and support features and functions onto a single VLSI integrated circuit chip. In particular, the teachings of the invention may be implemented in an Integrated Gigabit Ethernet PCI-X Controller.

The computer bus and the multiprotocol bus interface adapter may be adapted to employ a PCI protocol, a PCI-X protocol, or both. An embodiment of the present invention may further include a management bus controller coupled with the multiprotocol bus interface adapter. The management bus controller is adapted to monitor and manage pre-selected components coupled with one of the communication network and the computer bus. The management bus controller is adapted to employ at least one of an Alert Standard Format (ASF) specification protocol, a System Management Bus (SMBus) specification protocol, an Intelligent Platform Management Interface (IPMI) specification protocol, and a Simple Network Management Protocol (SNMP).

In one embodiment, the network controller includes a 10/100/1000BASE-T IEEE Std. 802.3-compliant transceiver and media access controller (MAC) coupled with the communication network; a buffer memory coupled with the MAC, wherein the buffer memory includes one of a packet buffer memory, a frame buffer memory, a queue memory, or a combination thereof; and a central processing unit ("CPU") used for transmit functions and a CPU used for receive functions coupled with the multiprotocol bus interface adapter and the management bus controller. The multiprotocol computer bus interface adapter, the management bus controller, or both can include at least one of a Gigabit Media Independent Interface (GMII) interface, an 10-Gigabit Media Independent Interface (XGMII), a 10-Gigabit attachment unit interface), XSBI (10-Gigabit serial bus interface (XAUI), a Serial Gigabit Media Independent Interface(SGMII), a Reduced Gigabit Media Independent Interface (RGMII), a Reduced Ten Bit Interface (RTBI), a Ten-Bit Interface (TBI), a Serial Gigabit Media Independent Interface (SMII), and a Media Independent Interface (MII). Also, the multiprotocol bus interface adapter is suited to interface one of an IEEE Std. 802.3-like protocol, a SONET/SDH-like protocol, a Fiber-Channel-like protocol, an SCSI-like protocol, and an InfiniBand-like protocol.

In certain embodiments of the present invention, the network controller can be realized in a single-chip VLSI implementation, for example, an 0.18 micron CMOS VLSI implementation, which can be particularly advantageous for application of these embodiments to Gigabit Ethernet network interface cards and LAN-on-Motherboard (LOM) systems.

BRIEF DESCRIPTION OF THE DRAWINGS

These and other features, aspects and advantages of the present invention will be more fully understood when considered with respect to the following detailed description, appended claims and accompanying drawings, wherein:

DEFINITION OF TERMS

"Network Controller." A system that controls an interface to a network. A network controller may comprise, for example, any combination of hardware, firmware and/or software. A network controller may take the form of, for example, an integrated circuit, a circuit board, a motherboard, and/or a system consisting of any combination of these components.

"Network Controller Integrated Circuit." An integrated circuit that incorporates network control functions.

"Network Interface Card (NIC)." A network controller implemented on a circuit board such as an add-in adapter card or implemented as a LAN-on-motherboard solution.

"Ethernet Controller." A system that controls an interface to an Ethernet network. An Ethernet controller may comprise, for example, any combination of hardware, firmware and/or software. An Ethernet controller may take the form of, for example, an integrated circuit, a circuit board, a motherboard, and/or a system consisting of any combination of these components.

"Ethernet Controller Integrated Circuit." An integrated circuit that incorporates Ethernet network control functions.

"Ethernet Network Interface Card (ENIC)." An Ethernet controller implemented on a circuit board such as an add-in adapter card or implemented as a LAN-on-motherboard solution.

"Voltage Converter." A circuit that converts an input voltage to an output voltage. In one embodiment, this comprises a transistor.

"Voltage Converter Controller." A circuit that controls the output voltage of a voltage converter.

"Alert Sending Device (ASD)." A communications device that is capable of sending ASF-defined alerts. This is further defined, for example, in the DMTF's ASF specification. Examples of Alert Sending Devices include, for example, Ethernet controllers and modems.

"Alert Standard Format Controller." Logic that handles ASF-related functions. This logic may comprise one or more processors and associated firmware and/or software, e.g., a CPU. This logic may comprise one or more hardware state machines.

"Clock Controller." Logic that controls one or more clocks. This logic may comprise, for example, phase lock loop circuits, multiplexers, registers, a processor and associated firmware and/or software and/or hardware state machines.

"Primary Power Source." A source of power that provides power under normal operating conditions.

"Auxiliary Power Source." A source of power that is auxiliary to a primary power source.

"Power Controller." Logic and/or associate code for controlling power consumption of a device.

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
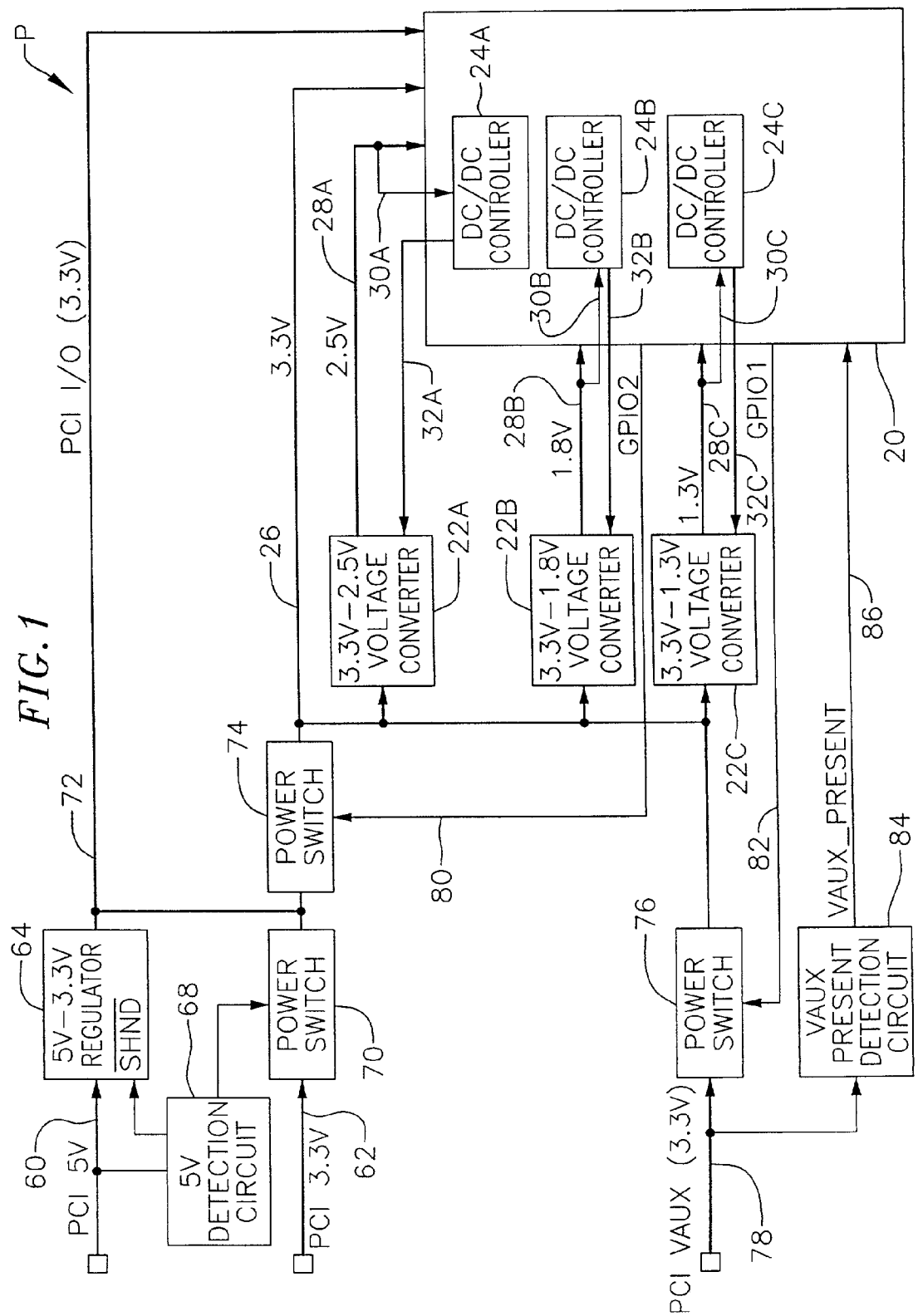
FIG. 1 is a block diagram of one embodiment of a power supply system according to the invention.

FIG. 1 illustrates one embodiment of a power supply system P constructed according to the invention including an integrated circuit 20 and a voltage converters 22A-22C, where voltage converter controllers 24A-24C for the voltage converters are located in the integrated circuit. Collectively, a voltage converter and a corresponding voltage converter controller constitute a voltage regulator.

The power supply system P converts an input voltage of 3.3 V to three direct current voltages provided to the integrated circuit: 2.5V, 1.8V and 1.3V. Specifically, lead 26 provides the 3.3V power signal to each of the voltage converters. Regulator 22A converts the 3.3V to 2.5V, which is supplied to the integrated circuit via lead 28A. Regulator 22B converts the 3.3V to 1.8V, which is supplied to the integrated circuit via lead 28B. Regulator 22C converts the 3.3V to 1.3V, which is supplied to the integrated circuit via lead 28C.

Figure 3:
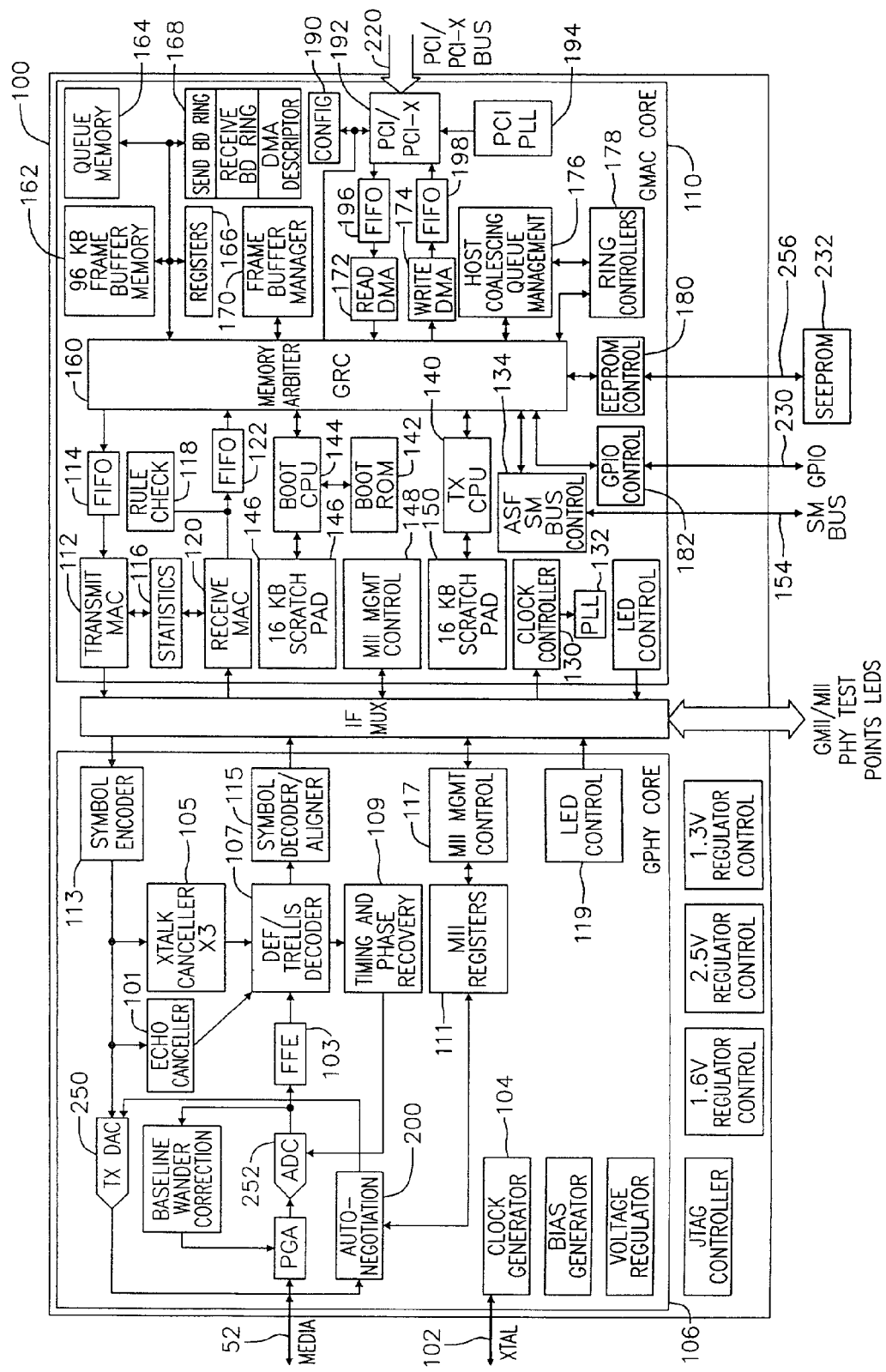
FIG. 3 is a block diagram of one embodiment of an integrated, high-bandwidth local area network controller according to the invention.
Figure 7:
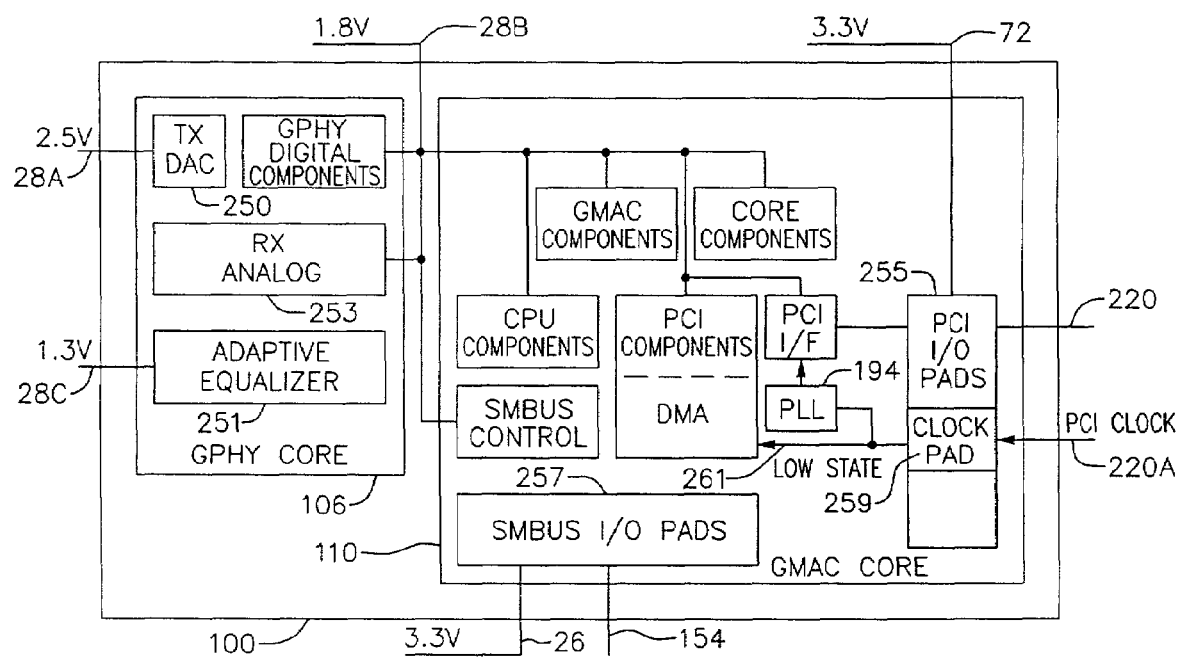
FIG. 7 is a block diagram of one embodiment of a bus interface and power distribution according to the invention.

Referring to FIGS. 3 and 7, additional details of one embodiment of a power supply distribution scheme will be discussed briefly. In this embodiment, the 2.5V supply powers the transmit-side analog function (TX DAC) 250 in a Gigabit PHY core ("GPHYCORE") 106. The 1.3V supply powers the digital adaptive equalizer function 251 in the GPHYCORE. The 1.8V supply powers virtually all of the digital logic in a Gigabit Media Access Controller Core ("GMAC Core") 110, the digital logic in the Gigabit Physical Layer Core ("GPHY Core") 106 and the receive-side analog function 253 in the integrated circuit.

Referring again to FIG. 1, the 3.3V input voltage 26 is supplied by a power switching circuit. The power switching circuit and the power supply distribution scheme are discussed in more detail below.

The controllers 24A-24C control the voltage converters 22A-22C to maintain the output voltages of the voltage converters (i.e., 2.5V, 1.8V and 1.3V) within certain a tolerance (e.g., +/−10%) under varying load conditions. The controllers control the output voltages by sampling the output voltages via leads 30A-30C and sending control signals 32A-32C to the voltage converters. The voltage converters, in turn, adjust their output voltages in response to the control signals.

Significantly, the integrated circuit 20 draws virtually no extra power by incorporating the control circuit in the integrated circuit and using external PNP transistors for the voltage conversion. Moreover, this implementation enables the integrated circuit chip 20 to be implemented in a standard package with essentially no extra heat dissipation requirements.

The on-chip regulator control provides a novel approach for controlling the regulated voltage. Specifically an internal CPU (e.g., CPU 144 in FIG. 3) can read from and write to the regulator control register to vary the output voltage if necessary. In contrast, in conventional systems that use an external regulator, such control is accomplished manually. For example, an extra device such as a variable register potentiometer must be used to adjust the output voltage of some types of external regulators.

Figure 2:
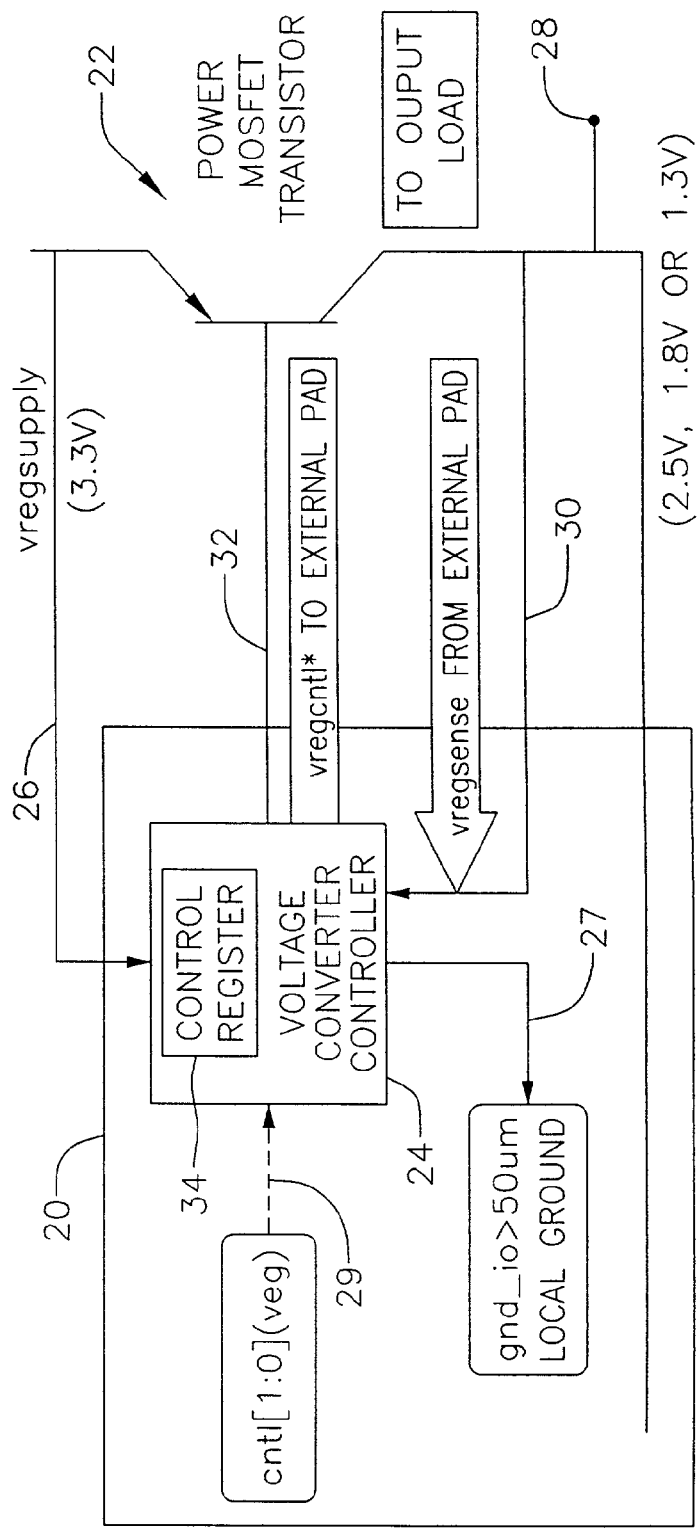
FIG. 2 is a block diagram of one embodiment of a voltage regulator and control system according to the invention.

One embodiment of a voltage converter and control system according to the invention is described in FIG. 2. Here, a controller 24 controls the output voltage of a voltage converter, specifically, a power MOSFET transistor 22. In a similar manner as the embodiment of FIG. 1, the controller 24 resides in an integrated circuit 20.

The vregsupply signal 26 is an analog input-output ("IO") of the integrated circuit. In the embodiment of FIG. 2, this is the 3.3V Power Supply that powers the regulator.

The $gnd_{13}io$ signal 27 also is an analog IO. This is the ground supply at 0V that provides the ground reference for the regulator circuit and connects to local ground.

The vregsense signal 30 is an analog IO that senses the load voltage. In the embodiment of FIG. 2 this senses the voltage of the load from collector of the PNP transistor 22 and feeds this signal back to the controller.

An iddq signal (not shown) is a digital input that indicates a power down condition.

The cntl[1:0] signal 29 is a digital input to the control register 34 to control the output voltage of regulator. In the embodiment of FIG. 2, for example, for a 1.8V voltage regulator, the two bits define voltage levels of 1.8V, 1.5V, 1.4V or 1.3V. An CPU (e.g., internal CPU 140) can access the control register to program the desired output voltage.

A variety of circuitry may be used to implement the voltage converter control circuit 24. This includes, for example, an operational amplifier and/or other analog/digital comparators and techniques for specifying the desired output voltage. Various circuits may be used to implement the voltage converter 22, including, for example, switching regulator circuits.

A power controller as described, for example, in FIGS. 1 and 2 provides several advantages over conventional power supply systems. Significantly, as described herein, a relatively efficient power supply may be provided that is particularly useful for low power conditions. The power consumption of the control circuitry is negligible and the system may incorporate relatively efficient power conversion circuits such as the power MOSFET discussed above. Moreover, the portion of the power supply that has relatively high power dissipation is located outside of the integrated circuit.

The techniques of the invention may provide implementations that use relatively inexpensive components. By integrating the control functions into the integrated circuit, the design of the voltage regulator may be much simpler. In particular, such a design may incorporate relatively inexpensive power transistors instead of expensive external regulators.

Also, through the use of the control register, the output voltage and sensitivity of the power supply can be controlled based on, for example, system power conditions.

Further aspects of the invention will be discussed in conjunction with FIGS. 3 and 4. FIG. 3 depicts a network controller integrated circuit for a PCI bus. In accordance with one embodiment of the invention, the network controller is an ASD that supports ASF.

Figure 4:
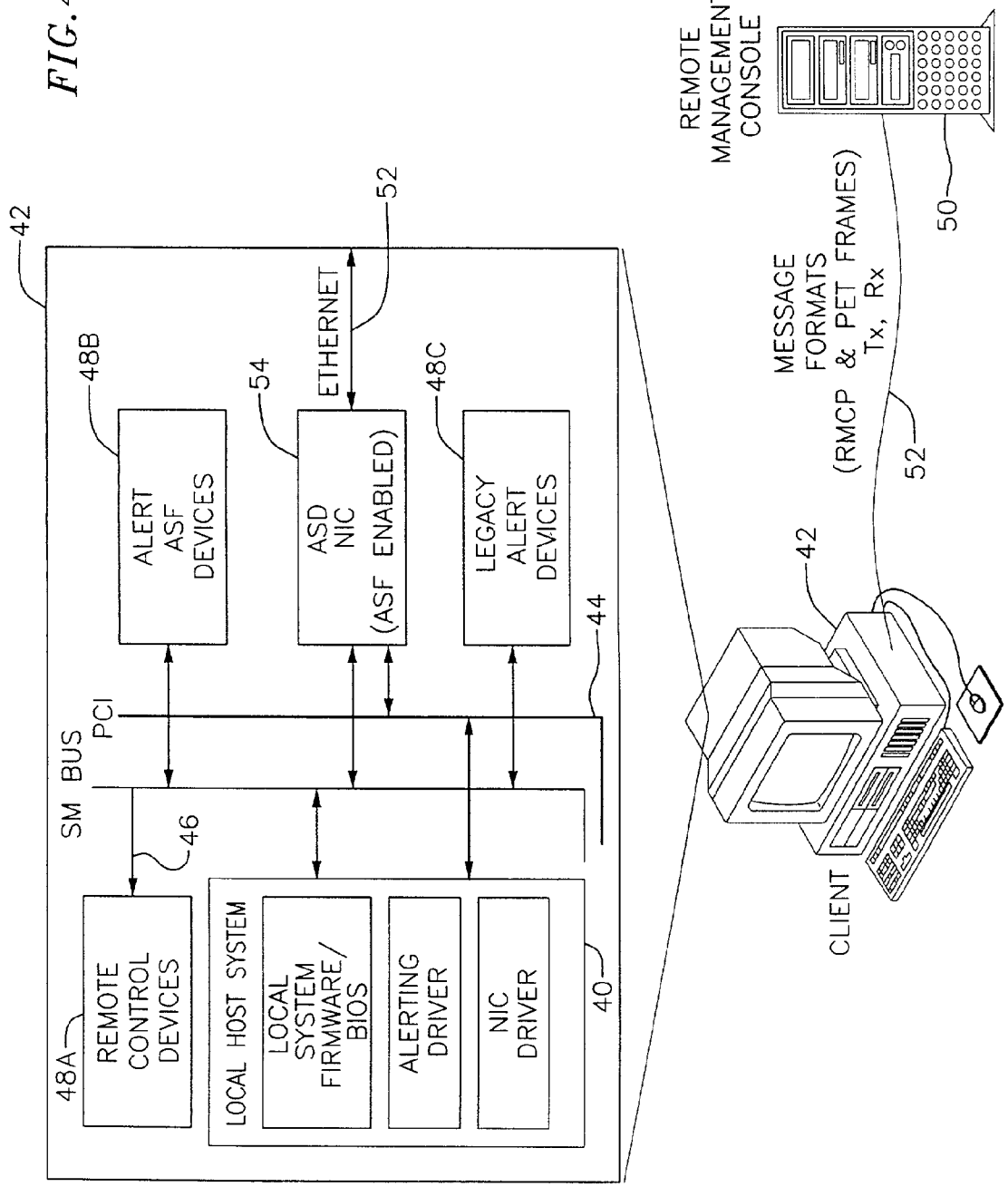
FIG. 4 is a block diagram of one embodiment of an ASF system.

FIG. 4, describes one embodiment of an ASF system. A local host system 40 (e.g., a motherboard) in a client computer system 42 supports a PCI bus 44 and an SMBus 46. Unless stated otherwise, the term PCI bus as used herein refers to all versions of the PCI bus including, for example, the original PCI bus and the PCI-X bus. Devices 48A-48C connected to the busses support alerting (ASF and legacy sensor devices) and remote control operations. A remote management console 50 manages the client 42 by communicating with the ASD 54 in that client via an Ethernet network 52.

Specifically, the remote management console communicates with an ASD 54 that supports ASF and relays ASF-related messages to and from the SMBus. Thus, ASF alert messages, polling operations, and remote control operations are accomplished via communications over the SMBus and the Ethernet network.

The ASF specification requires that a device perform ASF protocol processing in an OS absent environment. This includes, for example, generating and sending PET packets, interpreting and responding to RMCP messages and generating and interpreting ASF/SMBus messages.

The OS-absent condition may occur, for example, when the primary power for the PCI bus is off. The PCI bus does, however, provide an auxiliary power supply that may provide power to devices connected to the PCI bus in the event primary PCI power is off.

One embodiment of a power supply system that provides auxiliary PCI power to an integrated circuit when primary PCI power is off is described in FIG. 1. Primary PCI power may be supplied via 5V signals 60 and/or 3.3V signals 62. In the event the 5V power is supplied, the desired 3.3V is provided to the system using a regulator 64 to convert the 5V to 3.3V. A 5V detection circuit 68 controls a power switch 70 to ensure that the 3.3V line 72 is not driven by both of the PCI primary power signals.

In accordance with one embodiment of the invention, the integrated circuit 20 controls power switches 74 and 76 via general purpose input-output pins 80 and 82, respectively, to provide the 3.3V to the integrated circuit and voltage converters via lead 26. Specifically, when the primary PCI power source is on, power switch 74 supplies the 3.3V from lead 72 to lead 26. In addition, power switch 76 prevents the PCI auxiliary power 78 from supplying power to lead 26. Alternatively, when primary PCI power is off and the auxiliary power source is on, power switch 76 supplies the 3.3V from auxiliary power input 78 to lead 26 and power switch 74 prevents the lead 72 from supplying power to lead 26. Sensor circuit 84 provides a signal to the integrated circuit via lead 86 indicative of whether auxiliary power is available. Significantly, the PCI power management specification requires that a device only draw 375 mA of current from auxiliary power (Vaux power) when it is in the D3cold state.

In accordance with one aspect of the invention, an alert sending device is provided that supports the Alert Standard Format while powered only by PCI bus auxiliary power (Vaux power). In one embodiment of a power controller according to the invention, this is accomplished by reducing system clock speeds or disabling clocks, defining selected components that are powered off in this state, and providing appropriate contingencies for powered down components.

In the embodiment of FIG. 3, the invention implements an advanced, high-performance, high-bandwidth, highly-integrated controller, such as an Integrated Gigabit Ethernet PCI-X Controller 100, that integrates complex network communication, management, and support features and functions onto a single VLSI chip. Embodiments of the invention cant be configured as a network controller, which is coupled between a communication network and a computer bus, and which incorporates a multiprotocol bus interface, adapter and an alert supervisory bus controller.

In accordance with this aspect of the invention, all major ASF capabilities (alerting and RMCP) are operational while running off of PCI Vaux power. However, because gigabit PHYs consume large amounts of power while running at gigabit speeds, the ASF firmware configures the PHY to only advertise a slower speed (10 Mbit or 100 Mbit) when operating off of Vaux power. In some embodiments, operating at 10 Mbit or 100 Mbit is required in order to meet the 375 mA power requirement that the PCI power management specification requires for devices in the D3cold state.

Figure 5:
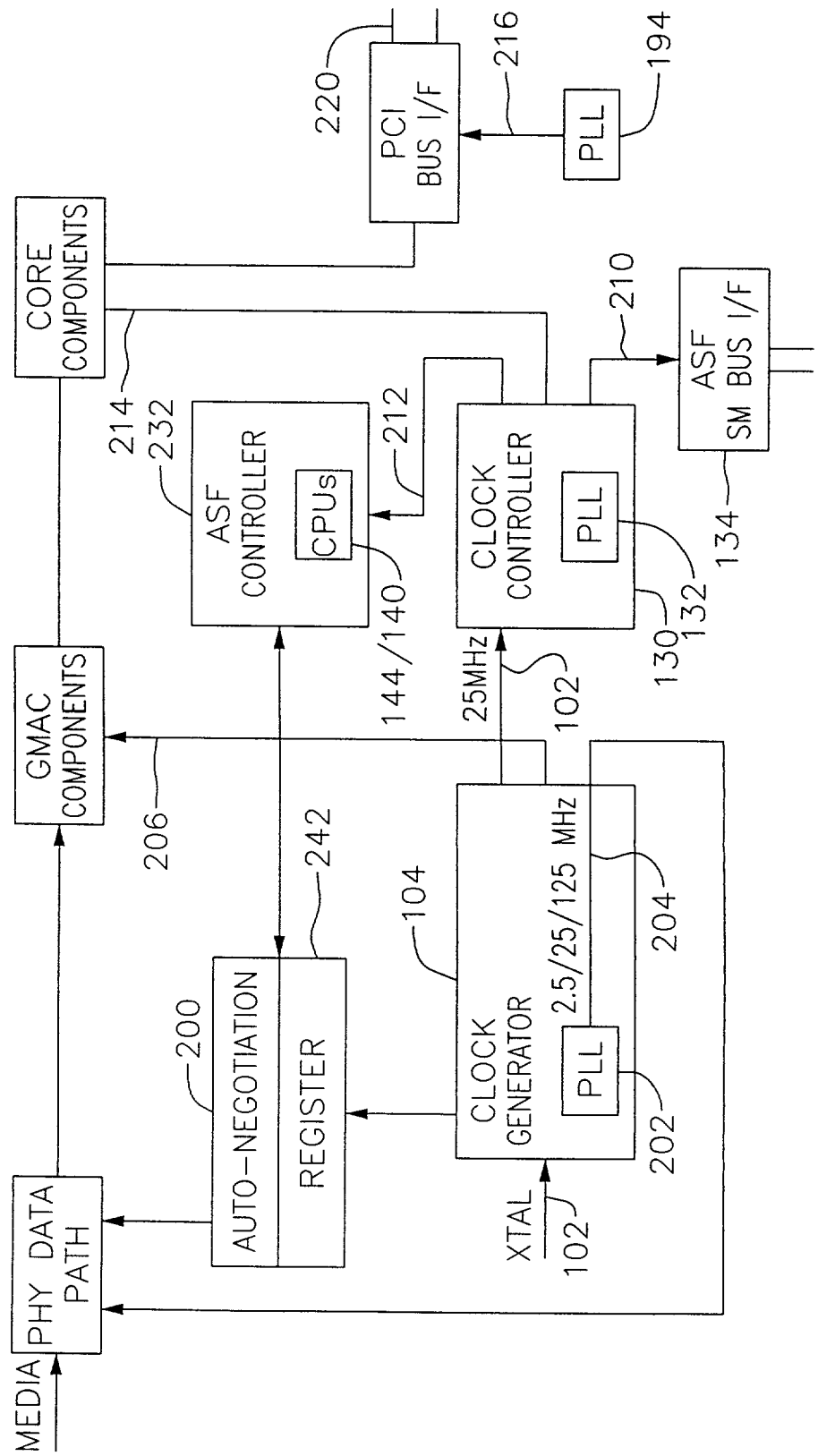
FIG. 5 is a simplified block diagram of one embodiment of a clock control system according to the invention.

The integrated circuit 100 of FIG. 3 incorporates several clock signals that clock specific components of the integrated circuit. The relationships and interconnections of these clocks will be described in more detail in conjunction with FIGS. 3 and 5. A 25 MHz crystal clock signal 102 provides the primary clock input to the integrated circuit 100. The clock signal 102 drives a clock generator (clock controller) 104. The clock generator 104 includes a phase lock loop ("PLL") 202 (FIG. 5) that generates PHY clocks 204 for the data path components in the PHY core 106. For example, the clock generator 104 provides a 2.5 MHz clock for PHY operation at 10 Mbits/second (Mbits) a 25 MHz clock for PHY operation at 100 Mbits and a 125 MHz clock for PHY operation at 1000 Mbits. The clock generator 104 also drives a GMAC clock 206 for the GMAC components 112, 114, 116, 118, 120 and 122 in the GMAC core 110 that interface with the PHY core 106.

The 25 MHz clock 102 also drives a clock controller 130 in the GMAC core. And a 25 MHz clock 210 drives the ASF SMBus control 134 which generates a 100 KHz clock for the SMBus. The clock controller 130 controls a phase lock loop 132 to generate clocks for several components in the GMAC core. The clock controller 130 generates a CPU clock 212 for the CPU components, e.g., components 140, 142, 144, 146, 148 and 150. The clock controller 130 generates a core clock 214 for the core GMAC components 160, 162, 164, 166, 168, 170, 176, 178, 180 and 182, as well as a portion of the DMA controllers 172 and 174.

A PCI bus phase lock loop 194 generates a clock 216 for a portion of the PCI bus interface 192 that directly interfaces with the PCI bus 220. The PCI bus phase lock loop 194 generates this clock from a clock from the PCI bus 220. The remaining PCI bus components 190, 192, 196, 198, as well as a portion of the DMA controllers (DMA engines) 172 and 174, are clocked by the clock from the PCI bus as well.

In a typical 1000 Mbit mode, the PHY clock operates at 125 MHz, the GMAC clock operates at 62.5 MHz, the core clock operates at 66 MHz and the CPU clock operates at 133 MHz. In accordance with one embodiment of the invention, to reduce power consumption when operating on auxiliary power, the speeds of these system clocks are reduced. For example, in one scenario the speed of the core clock is reduced to 44 MHz and the speed of the CPU clock is reduced to 88 MHz to meet the 375 mA current draw. Moreover, in the event this reduction in clock speed is insufficient to meet the 375 mA requirement the clock speeds can be reduced further. When the device is forced to operate in the 10 Mbit mode, the PHY clock may operate at 2.5 MHz, the GMAC clock may operate at 2.5 MHz, the core clock may operate at 12.5 MHz, and the CPU clock may operate at 25 MHz. These reduced clock speeds cause the integrated circuit to substantially reduce its power consumption.

Figure 6:
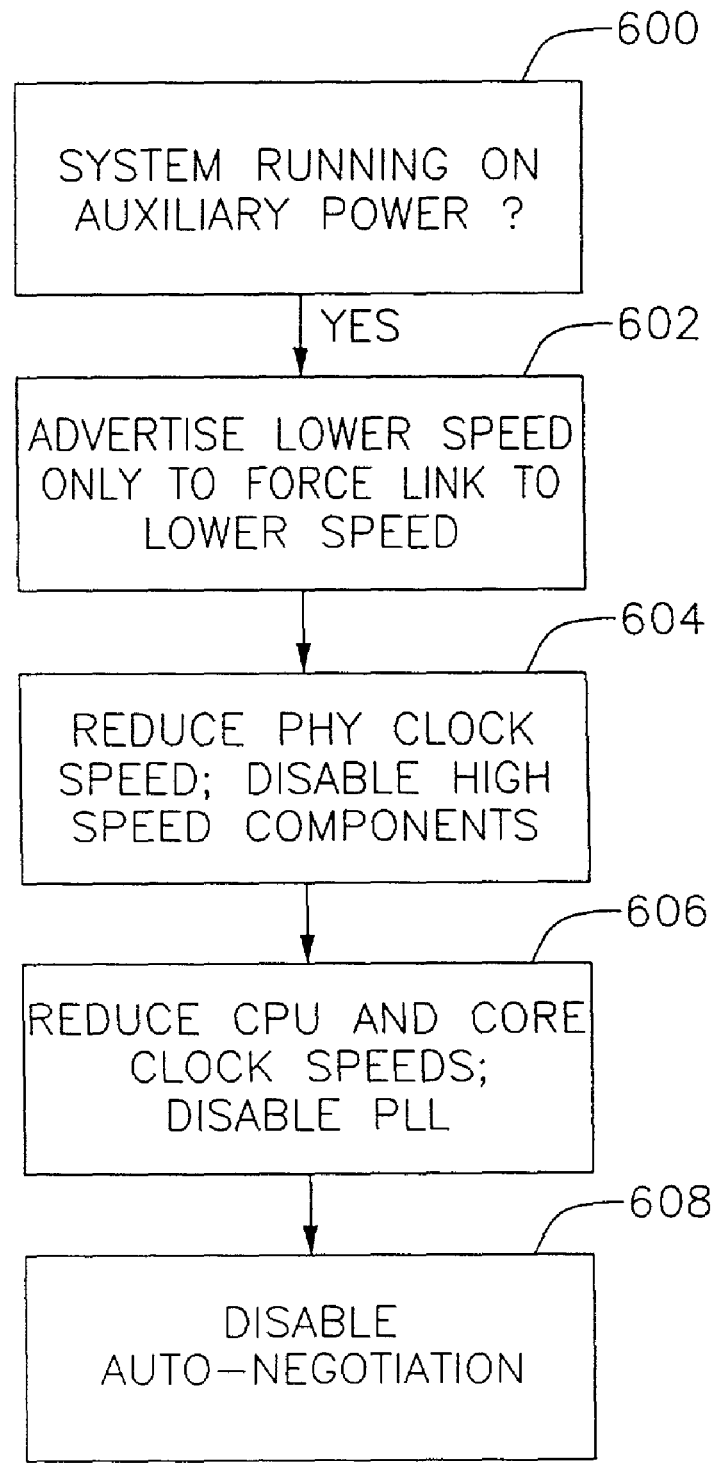
FIG. 6 is a flowchart illustrating one embodiment of configuration operations according to the invention.

Further to the above, one embodiment of the low power mode operations will be described in more detail in conjunction with the flowchart of FIG. 6. At block 600, the ASF controller 232 determines whether the system is running on auxiliary power by sensing the state of the PCI power. In one embodiment, this is accomplished by reading GPIO signals 230 via a sensor in the form of GPIO control 182 that indicates whether primary and/or auxiliary PCI power is available. In a relatively simple embodiment, this sensor consists of a pull-down resistor connected to a GPIO pad that is connected to primary PCI power. When the signal from this GPIO pad is low, the ASF controller performs the low power mode operations. The ASE controller may continually poll the GPIO to determine the state of the PCI power. Loss of primary power also may generate an interrupt. In addition, the ASF controller typically will attempt to determine the state of PCI power during boot operations.

If the system is running on auxiliary power, at block 602 the ASF controller advertises the 10 Mbit mode only and disables all the advanced functions used in 1000 Mbit (GMII) mode. In other words, the PHY is forced to renegotiate its connection with its peer. But now, the PHY can only advertise that it is capable of running at a lower speed. In one embodiment, this involves setting a flag in a register 242 in an auto-negotiation component 200. Upon reading this flag, the auto-negotiation component performs the renegotiation tasks. If successful, this includes lowering the PHY clock speed as discussed above.

This operation also involves disabling the dedicated TX_DAC 250 (FIG. 3) and the ADC 252 used in 1000 Mbit mode. The chip then enables the dedicated 10 MBit TX_DAC 250 and ADC 252. The frequencies are 40 MHz for the TX_DAC and 20 MHz for the ADC in the 10 Mbit mode. This is in contrast to an operating frequency of 125 MHz for the TX_DAC and the ADC in 1000 Mbit mode.

In addition, the speeds of the other clocks discussed above may be reduced (block 606). That is, depending on the power budget of the system the clock controller 130 may reduce the clock speeds to provide an 88 MHz clock for the CPU components and a 44 MHz clock for the core components. Alternatively, the clock controller may reduce the clock speeds even further. In this case, the clock controller 130 disables the PLL 132 and the clock controller 130 generates the 25 MHz CPU clock 212 and the 12.5 MHz core clock 214 from the 25 MHz clock 102.

Seamless switching of the CPU clock 212 and the core clock 214 may be accomplished using a clock switcher (not shown) in the clock controller 130 that allows the internal CPUs 144 and 140 to switch between a slower or faster clock on the fly. A control function in the clock switcher synchronizes both clock inputs (fast clock and slow clock) and controls the output of the clock so that it is always glitch free and maintains correct phase relationship. When a clock switch is requested, the internal state machine gracefully stops the runtime clock without causing any glitches (e.g., holds the clock to the low state) and synchronizes the alternate clock to the main clock. The state machine then initiates an internal counter to give enough settling time before it enables the new clock. This scheme also guarantees that the clock switching doesn't violate any setup or hold requirements and maintains the phase relationship between the core clock and the CPU clock. It will be appreciated that the phase relationship between the two clocks may be maintained because the two clock are derived from the same clock. Thus, the components do not need to be reset after the clock is switched to the slow or fast clock. This provides a significant advantage whereby the firmware is not required to reprogram/configure the system every time it switches to a new clock.

At block 608, if the auto-negotiation is successful, auto-negotiation remains disabled until primary PCI power is restored.

When the primary power of the PCI bus is off, the operation of PCI bus interface components is effectively disabled. For example, in the embodiment of FIG. 3, hardware functions that may be disabled in low power mode include the PCI interface and the DMA engines. Disabling these functions results in less current consumption, but does not compromise the device's ability to support ASF operations.

Referring now to FIGS. 1 and 7, additional techniques for further reducing power consumption and improve system operation when primary PCI power is lost will be discussed. In this power distribution scheme, the 3.3V power in FIG. 1 is divided into two sections that are isolated from each other. One section, lead 72, is driven only by primary PCI power. The other section, lead 26, may be driven by either primary or auxiliary PCI power. As shown in FIG. 7, the lead 72 only supplies power to the input-output pads 255 on the integrated circuit 100 for the PCI bus. The lead 26 supplies power to the remaining input-output pads (e.g., SMBus input-output pads 257).

The 1.8V lead 28B provides power to most of the digital components. This includes the CPU components (e.g., components 140, 142, 144, 146, 148 and 150 in FIG. 3); GMAC components (e.g., components 112, 114, 116, 118, 120 and 122 in FIG. 3); the Core components (e.g., components 160, 162, 164, 166, 168, 170, 176, 178, 180 and 182, including a portion of the DMA controllers 172 and 174 in FIG. 3); the GPHY digital components (e.g., components 101, 103, 105, 107, 109, 111, 113, 115, 117, 119 and 200 in FIG. 3); and the receive-side analog function 253.

Significantly, the 1.8V supply 28B also powers the PCI bus components (e.g., components 190, 192, 196, 198, and the remaining portion of the DMA controllers 172 and 174 in FIG. 3). In this way, power is supplied to the PCI bus components in the low power mode. Thus, data in the corresponding internal registers and the data memories will be preserved.

However, the clock for these PCI bus components will be disabled when the PCI bus is powered down. For example, the PCI PLL 194 will be disabled because the PCI bus clock 220A will be inactive. Significantly, in accordance with one embodiment of the invention, the input-output pad 259 (FIG. 7) for the PCI bus clock 220A maintains a steady state (e.g., a low state) when the pad 259 is not powered. For example, as a result of the loss of the 3.3V supply, lead 72. This is in contrast with conventional pads that may fluctuate when they are not powered. Moreover, the input clock 261 for the remaining PCI components (e.g., PCI bus components 190, 192, 196, 198) and the remaining portion of the DMA controllers 172 and 174 will also be maintained at a steady state. Thus, the integrity of the internal registers for the PCI bus components and DMA controllers may be maintained while the PCI clock signal to the components described above remains inactive. Hence, the invention advantageously provides lower power consumption by effectively disabling the PCI interface components and the internal DMA engines, while maintaining the state of the system.

In summary, a power controller scheme for reducing power consumption when operating on auxiliary power includes, for example, a power distribution scheme where certain devices are powered by auxiliary power and other devices are not, clock controllers for setting clocks to different speeds, and circuits for disabling clocks. This may include, for example, input-output pads for gating powered-off clocks to a known state (e.g., a low state), and associated control circuits and code.

Figure 8:
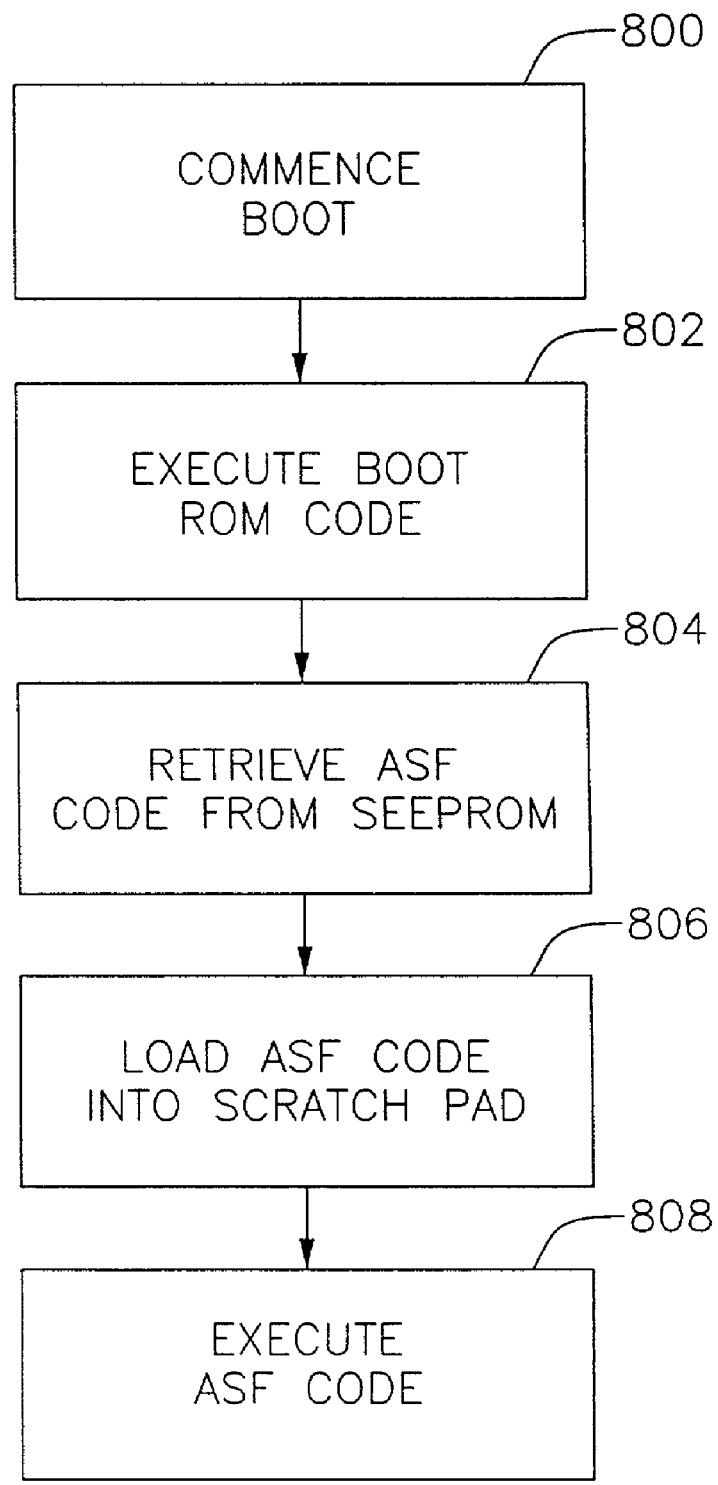
FIG. 8 is a flowchart illustrating one embodiment of boot operations according to the invention.

Another aspect of the invention provides an alert sensing device that can boot up while powered only by PCI bus auxiliary power. Referring to FIGS. 3 and 8, in one embodiment of the invention the ASF controller loads its ASF firmware and begins execution on its own. For example, the firmware retrieves configuration information from a non-volatile data memory and stores this data in on-chip data memory and/or registers. In addition, the firmware will store additional data structures and state information on-chip.

Referring now to block 800 in FIG. 8, the boot operation commences with either a hard or soft reset. At block 802, the boot CPU 144 boots using code stored in the internal non-volatile boot ROM 142. As represented by block 804, the boot CPU retrieves ASF firmware from the non-volatile SEEPROM 232 via a serial bus 256 in cooperation with an EEPROM control 180. The boot CPU loads the ASF firmware into one or more of the scratch pad data memories 146 and 150 (block 806). Then, as represented by block 808 one or both of the CPUs 140 and 144 execute the ASF firmware from the scratch pads 146 and/or 150 to perform the ASF operations.

Significantly, all of these operations may be performed when running on auxiliary power. The SEEPROM 232 and, as discussed above, all of the circuitry necessary for ASF communication via the SMBus and the Ethernet are powered by auxiliary power and enabled during this low power mode.

Thus, in accordance with this embodiment of the invention, the hardware components are configured to allow the necessary internal functions that support RMCP and alerting to be powered while operating off of a sufficient Vaux power source. These hardware functions include: Physical layer ("PHY"); SMBus 2.0 interface; Transmit and receive Ethernet MAC; Internal processors and any data memory that those processors use (e.g., the scratch pad memories); Interface to attached non-volatile memory; and any state machines and associated data memories (e.g., packet buffers) that are used to, for example, parse incoming packets, transmit packets generated by the processors, connect the processors with the MAC, track or store ASF related state information.

In the preferred embodiment of FIG. 3, each ASF controller contains two on-chip MIPs R4000 processor cores 140 and 144. Each MIPs processor has a dedicated 16 KB data memory, scratch pads 146 and 150, that can be used to store code and data that is used by the on-chip processor. Each processor can execute code out of its local scratch pad or out of the other processor's scratch pad, or out of the controller's packet buffer memory (e.g., 96 KB). However, fastest code execution is achieved when firmware for a given processor is running out of that processor's scratch pad memory. As discussed above, the processors are capable of bootstrapping themselves via code stored in the attached EEPROM.

Thus, in this embodiment hardware components provide the network interface, the raw SMBus interface, the SEEPROM interface, various timers, memory, and registers that are used by the firmware.

As discussed above, the ASF firmware may be stored off of the chip in a serial electrically-erasable programmable read-only memory (SEEPROM). The SEEPROM stores the ASF firmware executable code and data structures used by the executable code (e.g., configuration information). These data structures may include, for example, system state information, sensor characteristics and other information.

Figure 9:
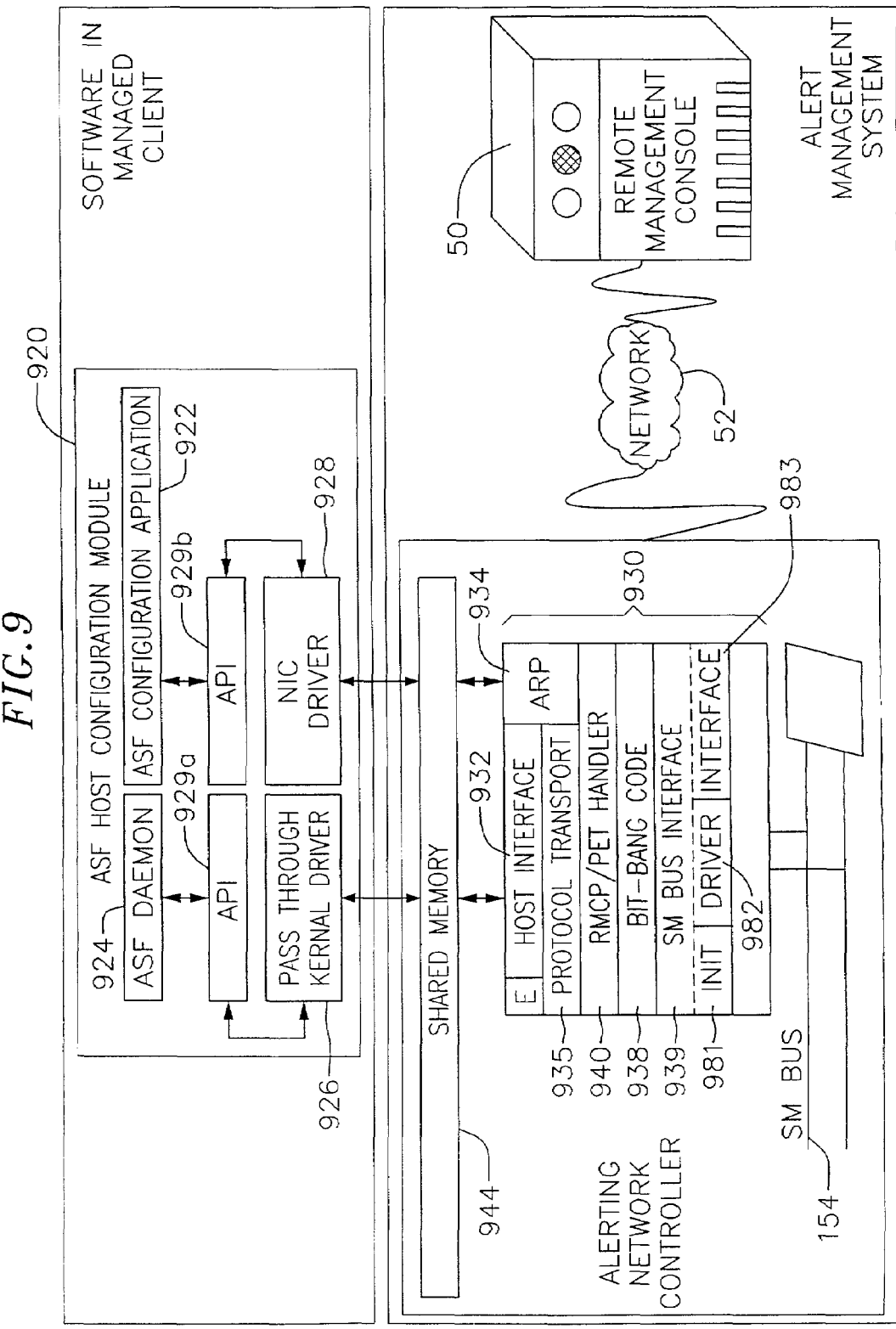
FIG. 9 is a logic block diagram of one embodiment of an alert network controller in the context of an alert management system.

Typically the configuration information is provided by a configuration utility 922 as represented in FIG. 9. For example, the configuration utility may retrieve alerting and RMCP information from system firmware along with other configuration information from the end user, and stores this information in the SEEPROM of the ASD.

As represented by the ASD firmware block 930 in FIG. 9, the ASF firmware executable code (represented, for example by blocks 932, 934, 935, 938, 939, 940, 981, 982 and 983) provides the intelligence that controls both the alerting and RMCP operations. This includes driving the Ethernet interface, formatting alerts, parsing incoming RMCP packets, and taking the appropriate action based on the contents of the remote control message. ASF Firmware also contains a subset of code that acts as an SMBus driver that manipulates the SMBus interface. The SMBus interface is used by the ASF-compliant ASD to interface with other ASF system components such as sensors.

In one embodiment the EEPROM can store up to 32 kbytes of data. Significantly, the use of a serial non-volatile memory may further reduce the power consumption of the chip in lower power mode due to the reduced number of input-output pins that must be driven. It should be appreciated by one skilled in the art that other forms of non-volatile memory such as FLASH memory may be used in accordance with the invention.

As discussed above, in a preferred embodiment of the invention, the ASF controller that performs ASF processing comprises an embedded processing function (e.g. embedded microprocessor) that allows firmware running on the ASD to handle ASF protocols and operations. However, in another embodiment, some or all of the ASF processing may be performed by dedicated hardware state machines. Hence, in accordance with the invention, a controller that supports ASF may consist of a variety of data processing components and techniques including, for example, a CPU with associated memory, firmware and support devices, or hardware state machines and supporting circuits, or any combination of these.

Figure 10:
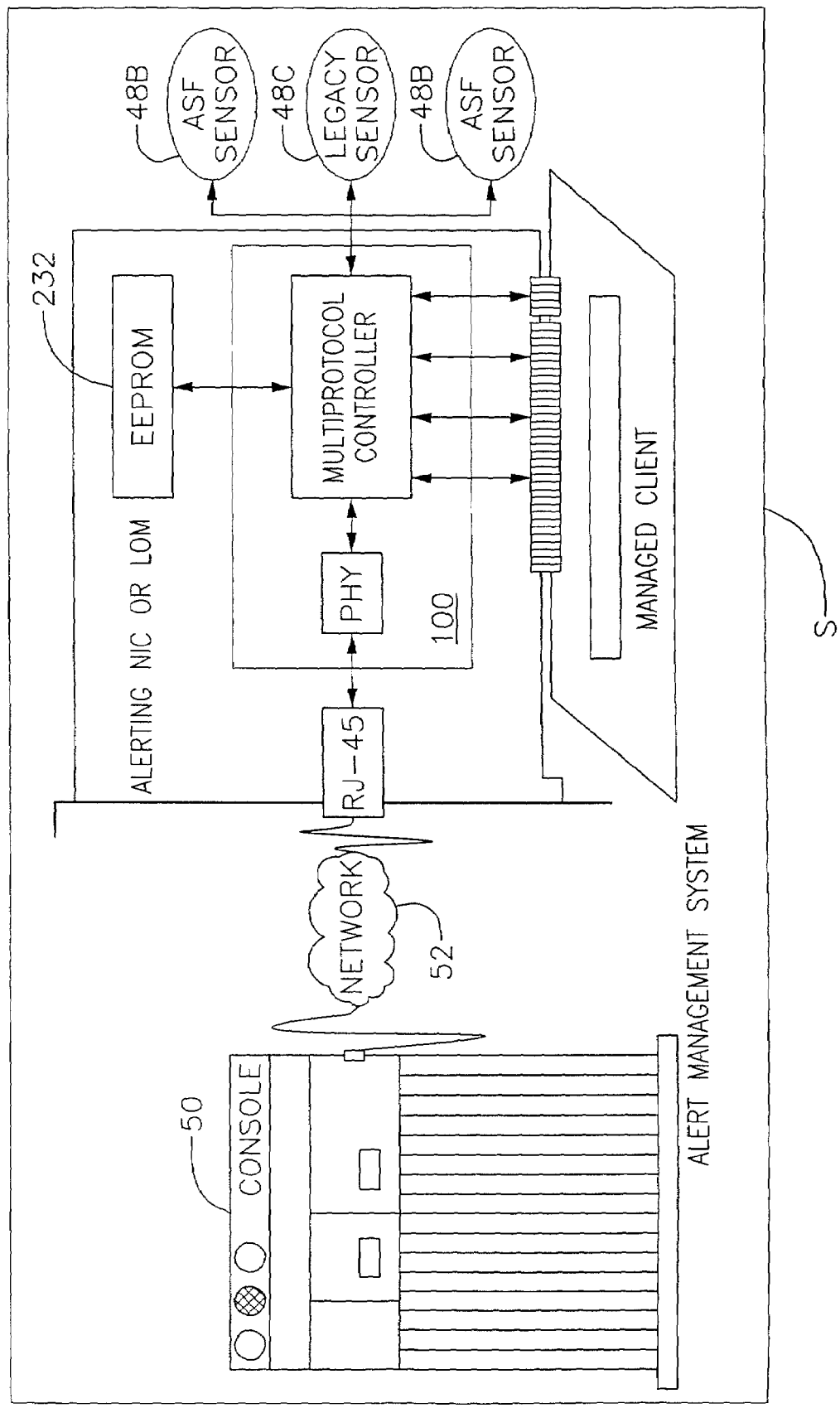
FIG. 10 is a block diagram of an alert management system having a multiprotocol controller according to the present invention.

Referring to FIG. 10, another embodiment of the invention is described. In FIG. 10, an embodiment of the invention is incorporated into alerting network interface card (NIC) or LAN-on-motherboard implementations. The term NIC is defined here to denote any network controller board including, for example, an add-in adapter card or a LAN-on-motherboard solution.

It will be apparent to the skilled practitioner that the invention can be employed in a variety of electronic components and in applications other than computer bus interface adapters, and it is intended that the scope of the present invention include such applications. For example, within the domain of IEEE Std. 802.3-related network adapters, the invention can be employed advantageously in a myriad of interfaces including, without limitation, XGMII (10-Gigabit Media Independent Interface), XAUI (10-Gigabit attachment unit interface), XSBI (10-Gigabit serial bus interface), SGMII (Serial Gigabit Media Independent Interface), RGMII (Reduced Gigabit Media Independent Interface), RTBI (Reduced Ten Bit Interface), GMII (Gigabit Media Independent Interface), as well as in TBI, SMII, and MII interfaces. IEEE Std. 802.3, 2000 Edition, CSMA/CD Access Method and Physical Layer Specifications, relevant to such implementations, is hereby incorporated herein in its entirety.

While certain exemplary embodiments have been described in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. An alert sending device, connected to be powered by at least one primary power source or an auxiliary power source, the alert sending device comprising:
   at least one alert standard format controller for performing alert standard format functions; and
   at least one power controller configured to receive a signal indicative of whether the alert sending device is powered by the auxiliary power source and, in response to the signal, for controlling reducing power consumption of the alert sending device.

2. The alert sending device of claim 1, wherein the alert sending device draws less than 375 mA of current when performing the alert standard format functions.

3. The alert sending device of claim 1, comprising at least one sensor for sensing a signal associated with one or both of the at least one primary power source and/or the auxiliary power source to provide the providing a signal to the at least one power controller, the signal indicative of whether the alert sending device is powered by the auxiliary power source.

4. The alert sending device of claim 1, wherein the power controller comprises at least one clock controller for setting a frequency of at least one clock signal to a lower frequency when the alert sending device is powered by the auxiliary power source.

5. The alert sending device of claim 4, wherein the at least one clock signal comprises a CPU clock.

6. The alert sending device of claim 4, wherein the at least one clock signal drives at least one processing component and at least one data path component.

7. The alert sending device of claim 6, wherein the at least one data path component comprises a network interface.

8. The alert sending device of claim 4, wherein the at least one power controller provides the at least one clock signal by switching between a first clock signal operating at a first frequency and a second clock signal operating at a second clock frequency.

9. The alert sending device of claim 8, wherein the at least one power controller switches between the first clock signal and the second clock signal without introducing glitches in the at least one clock signal.

10. The alert sending device of claim 8, wherein the at least one power controller temporarily drives the at least one clock signal to a fixed state while switching between the first clock signal and the second clock signal.

11. The alert sending device of claim 8, comprising at least one counter for determining a time limit while switching between the first clock signal and the second clock signal.

12. The alert sending device of claim 8, wherein the at least one power controller derives the first clock signal and the second clock signal from a common clock signal to maintain phase alignment while switching between the first clock signal and the second clock signal.

13. The alert sending device of claim 1, comprising at least one input-output pad for driving at least one clock signal to a steady state when the at least one primary power source is off.

14. The alert sending device of claim 1, wherein a first one of the at least one primary power source powers at least one input-output pad for a PCI bus and the auxiliary power source powers at least one input-output pad for another bus.

15. The alert sending device of claim 1, comprising at least one network controller integrated circuit.

16. The alert sending device of claim 1, comprising at least one network interface card.

17. The alert sending device of claim 1, wherein the at least one power controller disables one or both of a DMA engine and/or a PCI interface component.

18. The alert sending device of claim 1, wherein the at least one power controller provides auxiliary power to one or more of an internal CPU, a CPU memory, a packet buffer memory, a physical interface, and/or a media access controller.

19. The alert sending device of claim 1, wherein power consumption of the alert sending device is sufficiently reduced to enable the alert standard format controller to perform the alert standard format functions.

20. The alert sending device of claim 1, wherein, when the alert sending device is powered by the auxiliary power source, the at least one power controller provides power to maintain stored state information for at least one component of the alert sending device when at least a portion of the at least one component is disabled.

21. An Ethernet network controller, connected to at least one PCI bus primary power source and a PCI bus auxiliary power source, for performing alert standard format functions when the Ethernet network controller is powered by the auxiliary power source, the Ethernet network controller comprising:
   at least one interface for an Ethernet network;
   at least one interface for an SMBus;
   at least one interface for a PCI bus;
   at least one embedded processor for performing alert standard format functions via the at least one Ethernet interface and the at least one SMBus interface; and
   at least one clock controller for setting a frequency of at least one clock signal to a lower frequency when the Ethernet network controller is powered by the auxiliary power source.

22. The Ethernet network controller of claim 21, wherein the Ethernet network controller draws less than 375 mA of current when performing the alert standard format functions.

23. The Ethernet network controller of claim 21, comprising at least one sensor for providing a signal to the at least one processor, the signal indicative of whether the Ethernet network controller is powered by the PCI bus auxiliary power source.

24. The Ethernet network controller of claim 21, wherein the at least one clock controller generates a signal to change a data rate supported by the at least one Ethernet interface when the Ethernet network controller is powered by the PCI bus auxiliary power source.

25. The Ethernet network controller of claim 21, comprising at least one input-output pad for driving at least one PCI bus clock signal to a steady state when the at least one PCI bus primary power source is off.

26. The Ethernet network controller of claim 21, wherein the at least one PCI bus primary power source powers at least one input-output pad for a PCI bus and the PCI bus auxiliary power source powers at least one input-output pad for at least one of the SMBus and the PCI bus.

27. The network controller of claim 21, comprising at least one Ethernet network interface card.

28. The network controller of claim 21, wherein the at least one clock signal comprises a CPU clock.

29. The network controller of claim 21, comprising at least one power controller for disabling at least one of a DMA engine and a component of the PCI interface.

30. The network controller of claim 21, comprising at least one power controller for providing auxiliary power to one or more of an internal CPU, a CPU memory, a packet buffer memory, a physical interface, and/or a media access controller.

31. The Ethernet network controller of claim 21, wherein the Ethernet network controller disables auto-negotiation when the Ethernet network controller is powered by the auxiliary power source.

32. The Ethernet network controller of claim 21, wherein, when the Ethernet network controller is powered by the auxiliary power source, the Ethernet network controller renegotiates with a peer to establish a connection at a lower data rate.

33. The Ethernet network controller of claim 21, comprising at least one power controller wherein, when the Ethernet network controller is powered by the auxiliary power source, the at least one power controller maintains stored state information for a data interface when at least a portion of the data interface is disabled.

34. The Ethernet network controller of claim 21, comprising at least one power controller wherein, when the Ethernet network controller is powered by the auxiliary power source, the at least one power controller maintains stored state information for a data interface by providing auxiliary power to a first portion of the data interface when a second portion of the data interface is disabled.

35. The Ethernet network controller of claim 34, wherein the data interface comprises a PCI interface.

36. A method of providing alert standard format functions when powered by an auxiliary power source, comprising the steps of:
   performing, by an alert sending device, alert standard format functions
   receiving a signal indicative of whether the alert sending device is powered by the auxiliary power source; and
   controlling reducing, in response to the signal, power consumption of the alert sending device when the alert sending device is powered by the auxiliary power source.

37. The method of claim 36, wherein the controlling step includes the step of maintaining a current draw of less than 375 mA.

38. The method of claim 36, comprising the step of sensing a signal associated with at least one of at least one primary power source and the auxiliary power source to determine whether the alert sending device is powered by the auxiliary power source.

39. The method of claim 36, comprising the step of setting a frequency of at least one clock signal when the alert sending device is powered by the auxiliary power source.

40. The method of claim 36, comprising the step of reducing a frequency of at least one clock signal when the alert sending device is powered by the auxiliary power source.

41. The method of claim 40, wherein the at least one clock signal comprises a CPU clock.

42. The method of claim 40, wherein the at least one clock signal drives at least one processing component and at least one data path component.

43. The method of claim 42, wherein the at least one data path component comprises a network interface.

44. The method of claim 40, wherein the at least one clock signal is provided by switching between a first clock signal operating at a first frequency and a second clock signal operating at a second clock frequency.

45. The method of claim 44, wherein the switching between the first clock signal and the second clock signal is performed without introducing glitches in the at least one clock signal.

46. The method of claim 44, comprising temporarily driving the at least one clock signal to a fixed state while switching between the first clock signal and the second clock signal.

47. The method of claim 44, comprising determining a time limit while switching between the first clock signal and the second clock signal.

48. The method of claim 44, comprising deriving the first clock signal and the second clock signal from a common clock signal to maintain phase alignment while switching between the first clock signal and the second clock signal.

49. The method of claim 36, comprising the step of driving at least one clock signal to a steady state when a primary power source is off.

50. The method of claim 36, wherein the controlling step includes disabling one or both of a DMA engine and/or a PCI interface component.

51. The method of claim 36, wherein the controlling step includes enabling one or more of an internal CPU, a CPU memory, a packet buffer memory, a physical interface, and/or a media access controller.

52. The method of claim 36, wherein the controlling step includes providing auxiliary power to one or more of an internal CPU, a CPU memory, a packet buffer memory, a physical interface, and/or a media access controller.

53. The method of claim 36, wherein power consumption of the alert sending device is sufficiently reduced to enable the alert sending device to perform the alert standard format functions.

54. The method of claim 36, wherein, when the alert sending device is powered by the auxiliary power source, power is provided to maintain stored state information for at least one component of the alert sending device when at least a portion of the at least one component is disabled.

55. An alert sending device, connectable to be powered by at least one primary power source or an auxiliary power source, the alert sending device comprising:
at least one alert standard format controller for performing alert standard format functions; and
at least one power controller for reducing power consumption of the alert sending device when the alert sending device is powered by the auxiliary power source by performing one or both of reducing an operating frequency of at least one clock signal used by the alert sending device and/or providing power to maintain stored state information for at least one component of the alert sending device when at least a portion of the at least one component is disabled.

56. The alert sending device of claim 55, wherein, when the alert sending device is powered by the auxiliary power source, the at least one power controller reduces the operating frequency of the at least one clock signal and provides the power to maintain the stored state information when the at least a portion of the at least one component is disabled.

* * * * *